United States Patent
Hsieh

(10) Patent No.: US 10,866,746 B2
(45) Date of Patent: Dec. 15, 2020

(54) MEMORY ADDRESSING METHODS AND ASSOCIATED CONTROLLER, MEMORY DEVICE AND HOST

(71) Applicant: SILICON MOTION INC., Zhubei (TW)

(72) Inventor: Chao-Kuei Hsieh, Hsinchu County (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

(21) Appl. No.: 16/226,820

(22) Filed: Dec. 20, 2018

(65) Prior Publication Data

US 2019/0205047 A1   Jul. 4, 2019

Related U.S. Application Data

(60) Provisional application No. 62/610,937, filed on Dec. 28, 2017.

(51) Int. Cl.
*G06F 3/06* (2006.01)
*G06F 12/06* (2006.01)

(52) U.S. Cl.
CPC .......... *G06F 3/0622* (2013.01); *G06F 3/0607* (2013.01); *G06F 3/0637* (2013.01);
(Continued)

(58) Field of Classification Search
CPC ..................................................... G06F 12/06
See application file for complete search history.

(56) References Cited

U.S. PATENT DOCUMENTS

2008/0172515 A1   7/2008   Croxford
2008/0266924 A1   10/2008  Abedifard
(Continued)

FOREIGN PATENT DOCUMENTS

CN   101650690   2/2010
CN   101782870   7/2010
(Continued)

OTHER PUBLICATIONS

Technical Committee SD Card Association, "SD Specifications part 1 Physical Layer Simplified Specification", Version 6.0, Apr. 10, 2017. (Year: 2017).*
(Continued)

*Primary Examiner* — Edward J Dudek, Jr.
(74) *Attorney, Agent, or Firm* — Duane Morris LLP

(57) ABSTRACT

The present invention provides a method for accessing a secure digital (SD) card, which includes a voltage supply pin for receiving voltage supply from a host, at least one ground pin, a clock pin for receiving a clock signal from a host, a command pin for receiving a command from a host, and four data pins for writing data into the SD card or reading data from the SD card. The method includes receiving, via the command pin, an address extension command including a first address from a host, receiving, via the command pin, an access command including a second address from a host, and accessing, via the data pins, at least a memory location of the SD card indicated by a third address, which is a combination of the first address and the second address. The access command indicates an access operation to be performed on the SD card selected from: a single read operation, a single write operation, a multiple read operation, a multiple write operation and an erase operation.

15 Claims, 11 Drawing Sheets

(52) U.S. Cl.
CPC .......... *G06F 3/0659* (2013.01); *G06F 3/0679* (2013.01); *G06F 12/06* (2013.01)

(56) References Cited

U.S. PATENT DOCUMENTS

| | | | |
|---|---|---|---|
| 2009/0327644 A1* | 12/2009 | Lee | G06F 12/0623 711/202 |
| 2011/0119431 A1* | 5/2011 | Chowdhury | G11C 16/3418 711/103 |
| 2011/0153896 A1 | 6/2011 | Sugiyama et al. | |
| 2012/0173791 A1 | 7/2012 | Wang et al. | |
| 2014/0089568 A1 | 3/2014 | Chung et al. | |
| 2015/0113198 A1 | 4/2015 | Li et al. | |
| 2017/0308318 A1 | 10/2017 | Yang et al. | |
| 2019/0163385 A1* | 5/2019 | Agarwal | G06F 9/50 |

FOREIGN PATENT DOCUMENTS

| | | |
|---|---|---|
| CN | 102214482 A | 10/2011 |
| CN | 103268775 A | 8/2013 |
| CN | 103809920 | 5/2014 |
| CN | 104679592 | 6/2015 |
| KR | 10-0783988 | 12/2007 |
| TW | M253045 | 12/2004 |
| TW | I382306 | 1/2013 |
| TW | 201511013 A | 3/2015 |
| TW | I575375 | 3/2017 |
| TW | I599880 | 9/2017 |
| TW | 201741882 | 12/2017 |

OTHER PUBLICATIONS

Search Report dated Jun. 10, 2019 for Taiwan Patent Application No. 107146579 filed on Dec. 22, 2018. pp. 1-5.
International Search Report and Written Opinion issued to International Appl No. #PCT/CN2018/125004 filed on Dec. 28, 2018, dated Mar. 27, 2019. pp. 1-10.
First Office Action for related TW Application 107147893 dated Nov. 29, 2019. pp. 1-5.

\* cited by examiner

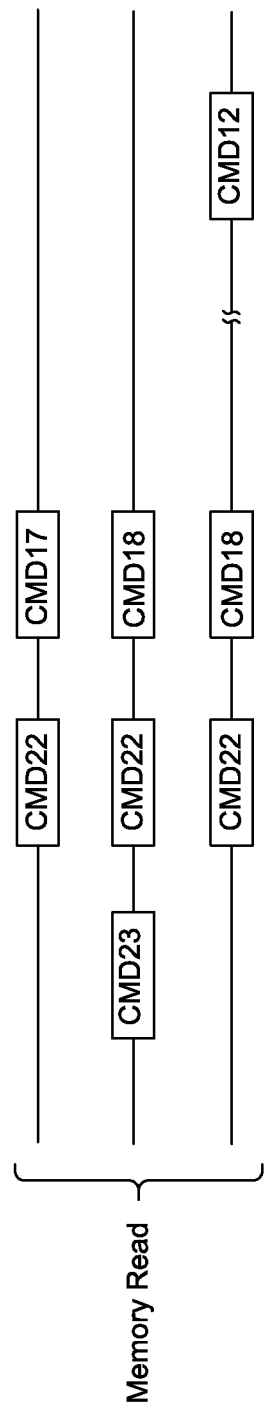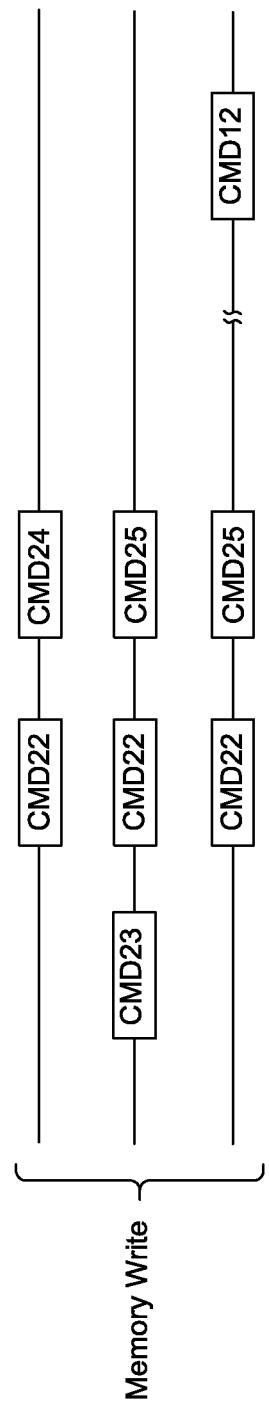

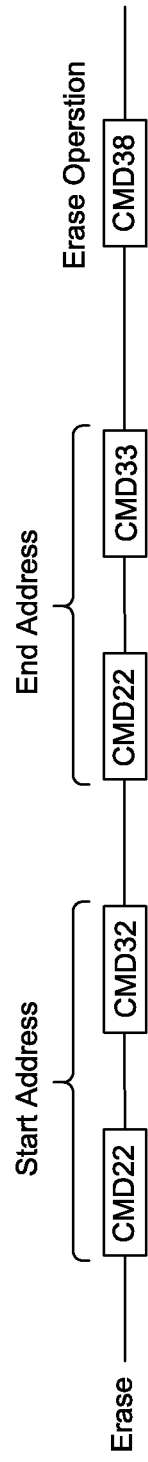

MEMORY ADDRESSING METHODS AND ASSOCIATED CONTROLLER, MEMORY DEVICE AND HOST

BACKGROUND OF THE INVENTION

1. Field of the Invention

The present invention relates to a method for a memory device and a related controller, memory device and host, and more particularly, to a memory addressing method for a memory device and a related controller, memory device and host.

2. Description of the Prior Art

Along with the widespread use of digital communication devices or electronic devices for processing video data and/or music data, and the universalization of IA (Internet Appliance) products, various types of storage devices for storing digital data have been developed. Memory cards have become the mainstream product in the market because of the advantages of compact volume and low power consumption. The memory cards are quite suitable for use in various types of hosts/devices/systems, such as digital cameras, digital video cameras, MP3 players, mobile phones, personal digital assistants (PDA) or global positioning system (GPS) devices.

Secure digital (SD) cards are popular memory cards in the market. However, since the address parameter or argument in a command for an SD card has only 32 bits, currently the maximum storage capacity an SD card can support is 2 terabytes (TB), which has become insufficient for the capacity requirements in various applications. It is desirable to have SD cards which can support a greater capacity, and there is also a need to provide addressing or accessing methods for such SD cards.

SUMMARY OF THE INVENTION

Hence, one objective of the present invention is to provide an addressing method capable of accessing an SD card which supports a capacity greater than 2 TB, and provide related SD cards, controllers of the SD cards and hosts.

An embodiment of the present invention discloses a method for accessing a secure digital (SD) card, which includes a voltage supply pin for receiving voltage supply from a host, at least one ground pin, a clock pin for receiving a clock signal from a host, a command pin for receiving a command from a host, and four data pins for writing data into the SD card or reading data from the SD card. The method includes receiving, via the command pin, an address extension command including a first address from a host, receiving, via the command pin, an access command including a second address from a host, and accessing, via the data pins, at least a memory location of the SD card indicated by a third address, which is a combination of the first address and the second address. The access command indicates an access operation to be performed on the SD card selected from: a single read operation, a single write operation, a multiple read operation, a multiple write operation and an erase operation.

Another embodiment of the present invention discloses a controller of an SD card, which is configured to perform the above method.

Another embodiment of the present invention discloses a method for accessing an SD card, which includes a voltage supply pin for receiving voltage supply from the host; at least one ground pin; a clock pin for receiving a clock signal from the host; a command pin for receiving a command from the host; and four data pins for writing data into the SD card or reading data from the SD card. The method includes transmitting, via the command pin, an address extension command including a first address to the SD card; transmitting, via the command pin, an access command including a second address to the SD card; and accessing, via the data pins, at least a memory location of the SD card indicated by a third address, which is a combination of the first address and the second address. The access command indicates an access operation to be performed on the SD card selected from: a single read operation, a single write operation, a multiple read operation, a multiple write operation and an erase operation.

Another embodiment of the present invention discloses an SD card including a memory module, an input/output (I/O) interface, and a controller. The memory module includes a plurality of memory locations. The I/O interface includes a voltage supply pin for receiving voltage supply from the host, at least one ground pin, a clock pin for receiving a clock signal from the host, a command pin for receiving a command from the host, and four data pins for writing data into the SD card or reading data from the SD card. The controller is configured to: receive, via the command pin, an address extension command including a first address from the I/O interface; receive, via the command pin, an access command including a second address from the I/O interface; and access at least one of the plurality of memory locations indicated by a third address which is a combination of the first address and the second address. The access command indicates an access operation to be performed on the SD card selected from: a single read operation, a single write operation, a multiple read operation, a multiple write operation and an erase operation.

Yet another embodiment of the present invention discloses an electronic device capable of accessing an SD card. The SD card includes an I/O interface and a processor. The I/O interface includes a voltage supply contact for providing voltage supply to the SD card, at least one ground contact, a clock contact for providing a clock signal to the SD card, a command contact for providing a command to the SD card, and four data contacts for writing data into the SD card or reading data from the SD card. The processor is configured to: transmit, via the command contact, an address extension command including a first address to the SD card; transmit, via the command contact, an access command including a second address to the SD card; and access, via the data contacts, at least a memory location of the SD card indicated by a third address which is a combination of the first address and the second address. The access command indicates an access operation to be performed on the SD card selected from: a single read operation, a single write operation, a multiple read operation, a multiple write operation and an erase operation.

The objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates memory command sequences in accordance with some embodiments of the present invention.

FIG. 3 illustrates memory command sequences in accordance with some embodiments of the present invention.

FIG. 4A illustrates memory command sequences in accordance with some embodiments of the present invention.

FIG. 4B illustrates memory command sequences in accordance with some embodiments of the present invention.

DETAILED DESCRIPTION

Figure 1:
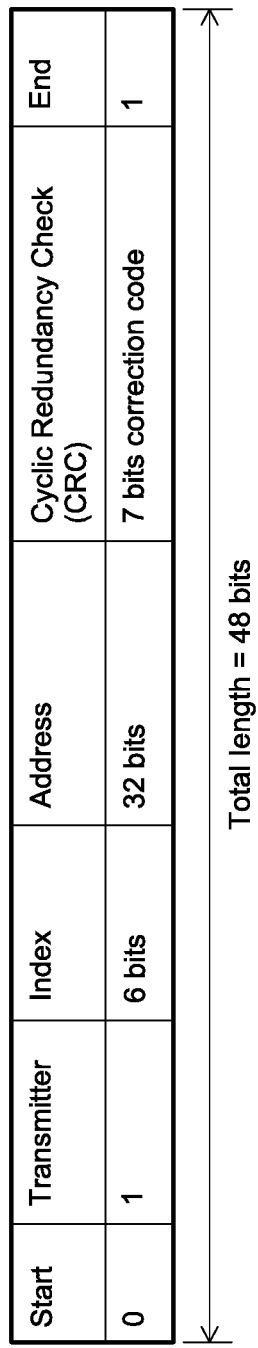
FIG. 1 illustrates a schematic diagram of a command for an SD card in accordance with some embodiments of the present invention.

FIG. 1 illustrates a schematic diagram of a command for an SD card in accordance with some embodiments of the present invention.

Communication between an SD card and a host is based on commands and data streams. A command may be considered as a request to perform a specific operation. A command is transmitted from the host to the SD card through a command (CMD) pin of the SD card. As shown in FIG. 1, the total length of a command is 48 bits. A command is initiated or preceded by a start bit ("0") and terminated or succeeded by a stop bit or an end bit ("1"). The transmitter bit being "1" denotes that the command is transmitted from the host to the SD card. A response from the SD card to the host is also transmitted via the command pin. In this case, the transmitter bit is set to be "0." The index includes 6 bits and indicates the type of the command, which determines the operation that is to be performed on the SD card. The definition of the various commands of the SD card is detailed in Section 4.7.3 of "Part 1 Physical Layer Specification" published by the SD Card Association. The address argument (or address parameter) includes 32 bits and indicates the address information of the command. The cyclic redundancy check (CRC) code includes 7 bits and is used to detect transmission error and protect the contents in the index and the address of the command.

Examples of different types of commands are described below.

A CMD17 command indicates a command which performs a single read (or single block read) operation on a memory location in the SD card indicated by the 32-bit address in the command Since the binary code of decimal number 17 is "10001," the index of CMD 17 command is "10001." A CMD24 command indicates a command which has the index "11000" and performs a single write (or single block write) operation on a memory location in the SD card indicated by the 32-bit address in the command Since the binary code of decimal number 24 is "11000," the index of CMD 24 command is "11000."

A CMD18 command indicates a command which has the index "10010" and performs a multiple read (or multiple block read) operation from a memory location in the SD card indicated by the 32-bit address in the command. A combination of a CMD23 command and a CMD18 command (e.g., a CMD23 command followed by a CMD18 command) indicates a multiple read operation from a memory location in the SD card indicated by the 32-bit address in the CMD18 command, wherein the CMD23 has information of data read length.

A CMD25 command indicates a command which has the index "11001" and performs a multiple write (or multiple block read) operation from a memory location in the SD card indicated by the 32-bit address in the command. A combination of a CMD23 command and a CMD25 command (e.g., a CMD23 command followed by a CMD25 command) indicates a multiple write operation from a memory location in the SD card indicated by the 32-bit address in the CMD25 command, wherein the CMD23 has information of data write length.

A CMD38 command indicates a command which has the index "100110" and performs an erase operation on the SD card. For example, a combination of a CMD32 command and a CMD38 command (e.g., a CMD32 command followed by a CMD38 command) indicates an erase operation from a memory location in the SD card indicated by the 32-bit address in the CMD32 command A combination of a CMD32 command, a CMD33 command and a CMD38 command (e.g., a CMD32 command followed by a CMD33 command followed by a CMD38 command) indicates an erase operation from a memory location in the SD card indicated by the 32-bit address in the CMD32 command till a memory location in the SD card indicated by the 32-bit address in the CMD33 command.

A CMD44 command indicates a command which has the index "101100" and performs a data transfer operation on the SD card. For example, a combination of a CMD44 command and a CMD45 command (e.g., a CMD44 command followed by a CMD45 command) indicates a data transfer operation started from a memory location in the SD card indicated by the 32-bit address in the CMD45 command.

Conventionally, since the address information of an operation to be performed is indicated by the 32-bit address in one command corresponding to the operation, the addressing or accessing ability of one command is limited to 2 TB ($2^{32}$ (32-bit address)*$2^9$ (512B block)=$2^{41}$ Bytes=2 TB), which also limits the maximum capacity an SD card can support to 2 TB.

In some embodiments of the present invention, a memory addressing method which can support a capacity greater than 2 TB is provided. An address extension command is utilized to extend the 32-bit address in an access command to be more than 32 bits, which thus can provide a capacity greater than 2 TB. The access command may include the command CMD17, CMD18, CMD24, CMD25, CMD32, CMD33 or CMD44 described above, which carries address information for a corresponding operation to be performed. In some embodiments, the access command may be a combination of the command CMD17, CMD18, CMD24, CMD25, CMD32, CMD33 or CMD44 described above. The address extension command may be a command selected from the reserved command pool in conventional SD card application, i.e., the address extension command may be CMD22, CMD31, CMD39, CMD41 or CMD51. In some embodiments, the address extension command may be a combination of commands selected from the reserved command pool, for example, the address extension command may include two CMD22 commands.

In particular, an address extension command may have an index "010110" (CMD22) and carries an address in its 32-bit address argument, wherein the address may account for 6 bits (e.g., lower 6 bits of the 32-bit address argument), 32 bits or any other number of bits of the 32-bit address argument. The address in the address extension command is combined with the address in an access command that follows the address extension command to form a combined address that includes more than 32 bits and can be used to access a memory capacity greater than 2 TB. If the address in the address extension command has 6 bits, the combined address has 38 bits and enables access to 128 TB ($2^6*2$ TB=128 TB) memory space. If the address in the address extension command has 32 bits, the combined address has 64 bits and enables access to $2^{32}*2$ TB memory space. According to a preferred embodiment, the address in the address extension command may be an upper address of the combined address, and the address in the access command may be a lower address of the combined address. In another embodiment, the address in the address extension command may be a lower address of the combined address, and the address in the access command may be an upper address of the combined address.

In a preferred embodiment, the combined address is generated by connecting the address included in the address extension command and that included the access command in serial. For example, if the address included in the address extension command is [X31:X0] and the address included the access command is [Y31:Y0], the combined address is [X31:X0, Y31:Y0] (or [Y31:Y0, X31, X0] in some embodiments). FIG. 2 illustrates examples of memory read command sequences in accordance with some embodiments of the present invention. The address extension command CMD22 precedes the single read command CMD17 or the multiple read command CMD18. The address extension command CMD22 carries an address (in its 32-bit address argument) to be combined with an address in the single read command CMD17 or the multiple read command CMD18 to form a combined address that includes more than 32 bits and indicates a memory location where the single read operation or the multiple read operation is performed.

Regarding the multiple read operation, a CMD23 command may be used to set the data read length of the operation. Optionally, a CMD12 command may be used to stop the multiple read operation without setting the data read length of the multiple read operation by a CMD23 command.

FIG. 3 illustrates examples of memory write command sequences in accordance with some embodiments of the present invention. The address extension command CMD22 precedes the single write command CMD24 or the multiple write command CMD25. The address extension command CMD22 carries an address (in its 32-bit address argument) to be combined with an address in the single write command CMD24 or the multiple write command CMD25 to form a combined address that includes more than 32 bits and indicates a memory location where the single write operation or the multiple write operation is performed.

Regarding the multiple write operation, a CMD23 command may be used to set the data write length of the operation. Optionally, a CMD12 command may be used to stop the multiple write operation without setting the data write length of the multiple write operation by a CMD23 command.

FIG. 4A illustrates an example of memory erase command sequence in accordance with some embodiments of the present invention. One address extension command CMD22 precedes the CMD32 command and carries an address (in its 32-bit address argument) to be combined with an address in the CMD32 command to form a combined address that includes more than 32 bits and indicates a memory location where the erase operation is started. Another address extension command CMD22 precedes the CMD33 command and carries an address (in its 32-bit address argument) to be combined with an address in the CMD33 command to form another combined address that includes more than 32 bits and indicates a memory location where the erase operation is ended. The CMD38 command initiates the erase operation.

FIG. 4B illustrates an example of memory data transfer command sequence in accordance with some embodiments of the present invention. The CMD44 command indicates a data transfer operation on the SD card. The address extension command CMD22 precedes the CMD45 command and carries an address (in its 32-bit address argument) to be combined with an address in the CMD45 command, so as to form a combined address that includes more than 32 bits and indicates a memory location where the data transfer is started.

Figures 5A, 5B:
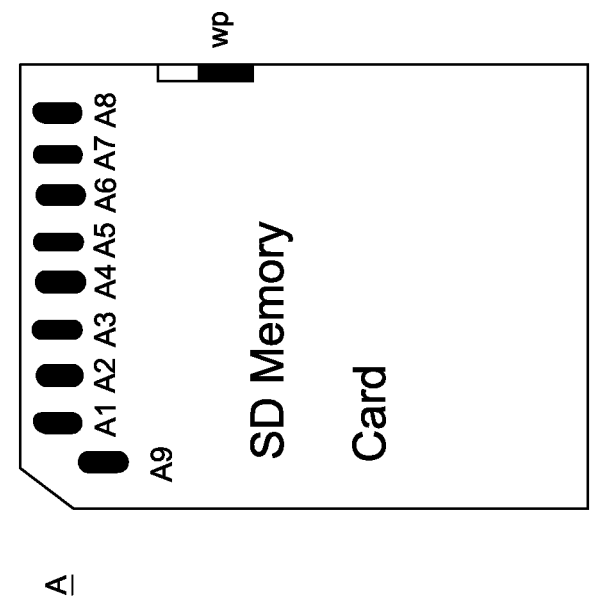
FIG. 5A is a schematic diagram of an SD card in accordance with some embodiments of the present invention.
FIG. 5B is a table of descriptions of the pins of an SD card in accordance with some embodiments of the present invention.

FIG. 5A is a top view of an SD card A. As shown in FIG. 5A, the SD card A includes 9 pins, which are labeled A1 to A9.

FIG. 5B is a table of descriptions or definitions of pins A1 to A9 of the SD card A shown in FIG. 5A. As shown in the table, pins A1 and A7 to A9 are data pins for writing data into the SD card A or reading data from the SD card A. Pin A2 is referred to as a command pin, which may receive a command transmitted from a host to the SD card A and may transmit a response in response to the command from SD card A to the host. Pin A4 is referred to as a VDD pin and operates as a voltage supply pin for SD card A. Pin A4 may be configured to receive a voltage within a range from 2.7 to 3.6 volts (V). Pin A5 is referred to as a clock (CLK) pin and is configured to receive a clock signal. Pins A3 and/or A6 are ground pins.

Figure 6:
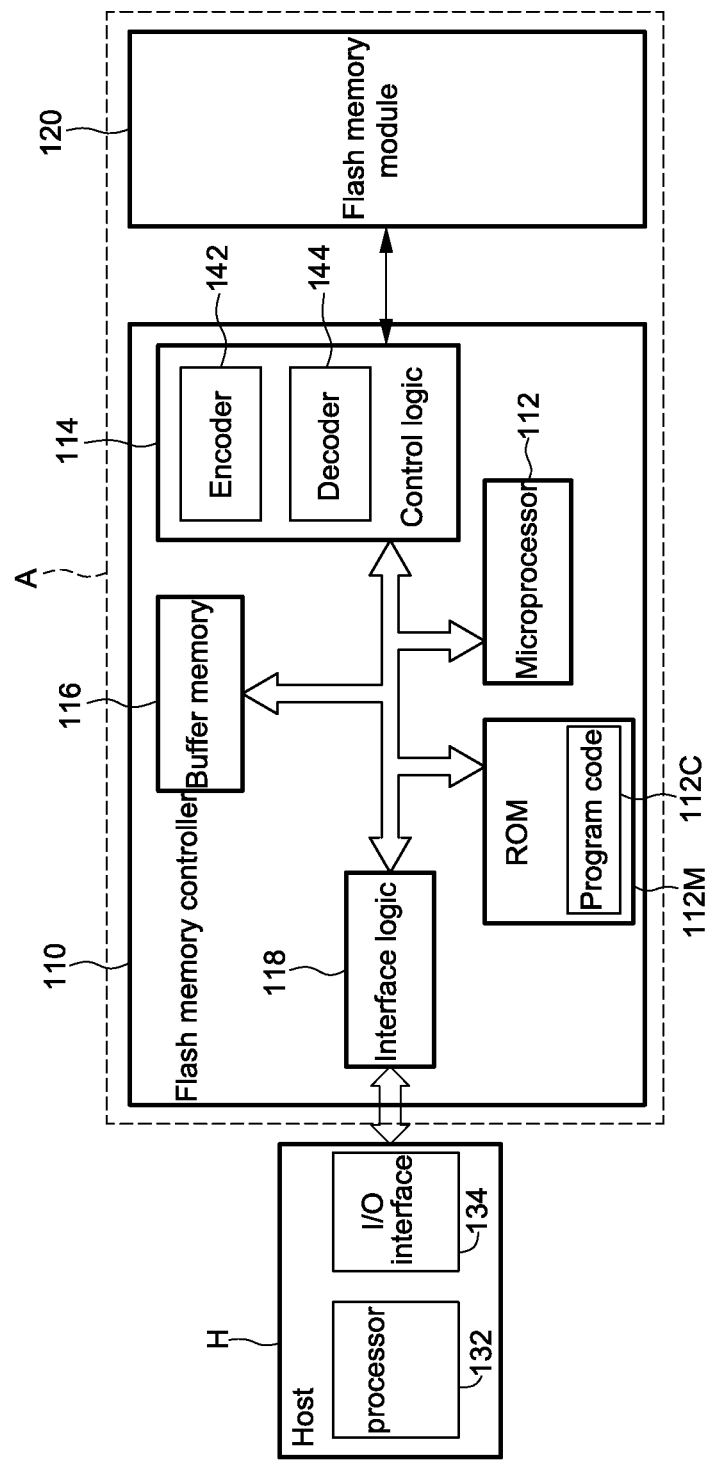
FIG. 6 is a block diagram showing the combination of an SD card and a host in accordance with some embodiments of the present invention.

FIG. 6 is a block diagram showing a combination of the SD card A and a host H in accordance with some embodiments of the present invention. The SD card A includes a flash memory module 120 and a flash memory controller (or controller) 110, wherein the flash memory controller 110 is arranged to access the flash memory module 120. The flash memory controller 110 may be configured to receive commands (e.g., address extension commands or access commands) from the host H and to access memory locations in the flash memory module 120 according to addresses in the commands. The flash memory controller 110 comprises a microprocessor 112, a read-only memory (ROM) 112M, a control logic 114, a buffer memory 116, and an interface logic 118. The ROM 112M is arranged to store a program code 112C, and the microprocessor 112 is arranged to execute the program code 112C in order to control the access to the flash memory module 120. The control logic 114 comprises an encoder 142 and a decoder 144.

In some embodiments, the flash memory module 120 comprises multiple flash memory chips, each comprising multiple blocks, and the flash memory controller 110 takes a "block" as the erase unit of performing operations on the flash memory module 120. The flash memory controller 110 may execute the program code 112C via the microprocessor 112. In some embodiments, a block may include a specific number of pages, wherein the flash memory controller 110 takes a "page" as the unit of writing data to the flash memory module 120. In some embodiments, the flash memory module 120 may include a 3D NAND-type flash memory.

In practice, the flash memory controller 110 which executes the program code 112C via the microprocessor 112 may use the inner elements thereof to perform various control operations, such as using the control logic 114 to control the access operations of the flash memory module 120 (especially the access operation on at least one block or at least one page), using the buffer memory 116 to perform the required buffering process, and using the interface logic 118 to communicate with the host H via the data pins of the SD card A. The buffer memory 116 may, for example, be a static random access memory (Static RAM (SRAM)), but the present invention is not limited thereto.

The host H may include a processor 132 and an input/output (I/O) interface 134 coupled to the SD card A. The I/O interface 134 may include contacts corresponding respectively to the pins of the SD card A (i.e., the I/O interface may include nine contacts). The I/O interface 134 may include a voltage supply contact for providing voltage supply, one or more ground contacts, a clock contact for providing a clock signal, and a command contact, for electrically connecting to the command pin of the SD card A, for providing a command to the SD card A. The definition of each contact of the host H may refer to the table shown in FIG. 5B.

Figure 7:
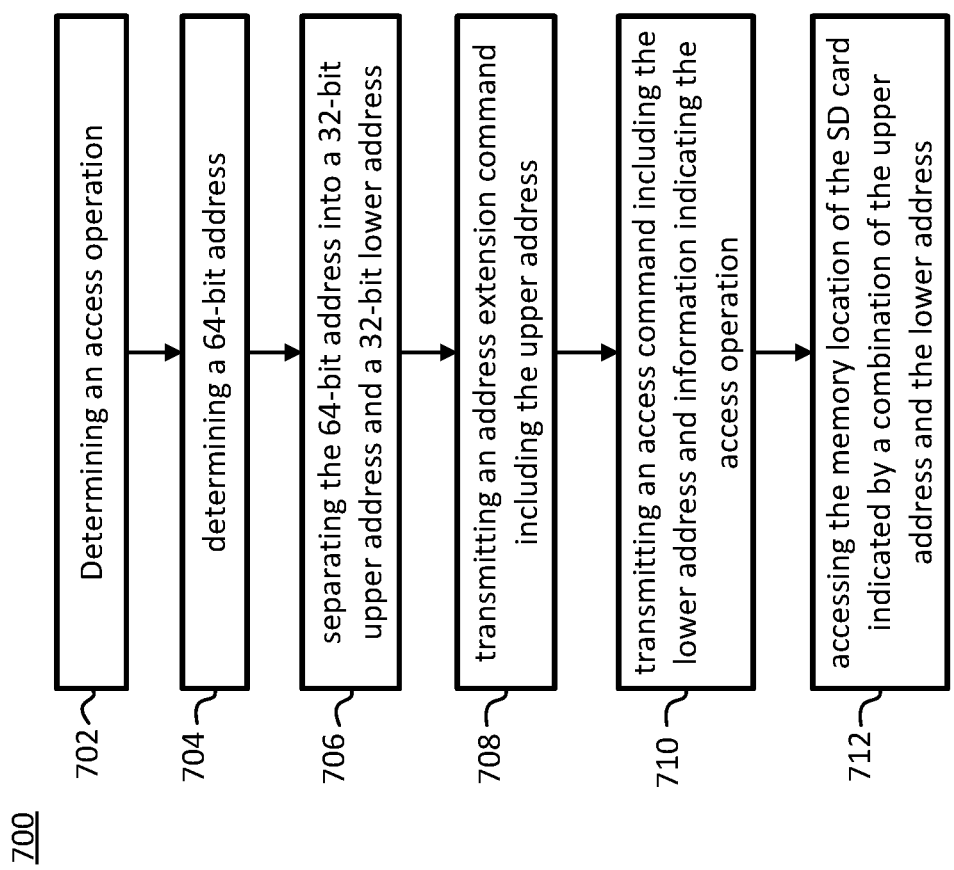
FIG. 7 is a flow chart of a method of a host for accessing an SD card in accordance with some embodiments of the present invention.

FIG. 7 is a flow chart of a method 700 performed by a host (or a processor of the host) for accessing an SD card in accordance with some embodiments of the present invention.

The detailed steps are as follows:

Step 702: The host determines an access operation to be performed on the SD card. The access operation may be selected from: a single read operation, a single write operation, a multiple read operation, a multiple write operation and an erase operation.

Step 704: The host determines a memory location of the SD card subject to the access operation, wherein the memory location can be indicated by a 64-bit address.

Step 706: The host separates the 64-bit address into a 32-bit upper address and a 32-bit lower address.

Step 708: The host transmits an address extension command including the upper address (in the address argument) to the SD card via a command pin of the SD card from an I/O interface of the host.

Step 710: The host transmits an access command including the lower address (in the address argument) and information indicating the access operation (in the index) to the SD card via the command pin of the SD card.

Step 712: The host accesses the memory location of the SD card indicated by a combined address, which is a combination of the upper address and the lower address, via data pins of the SD card.

In the embodiment described above, the upper address and the lower address are both 32 bits. In some other embodiments, the address indicating the memory location determined in Step 704 may be 38 bits, and the upper address may be 6 bits and the lower address is 32 bits. According to the present disclosure, the number of bits of the upper address may be any number not greater than 32 and thus is not limited to the above embodiments. Furthermore, in some embodiments, the address extension command may include the lower address and the access command may include the upper address.

In some embodiments, if the address extension command comprises a CMD22 command and the access command comprises a CMD17 command, the step of accessing the memory location of the SD card (Step 712) includes performing the single read operation on the memory location indicated by the combined address, which is generated according to the upper address included in the CMD22 command and the lower address included in the CMD17 command.

In some embodiments, if the address extension command comprises a CMD22 command and the access command comprises a CMD24 command, the step of accessing the memory location of the SD card (Step 712) includes performing the single write operation on the memory location indicated by the combined address, which is generated according to the upper address included in the CMD22 command and the lower address included in the CMD24 command.

In some embodiments, if the address extension command comprises a CMD22 command and the access command comprises a CMD23 command and a CMD18 command (as shown in FIG. 2), the step of accessing the memory location of the SD card (Step 712) includes performing the multiple read operation from the memory location indicated by the combined address, which is generated according to the upper address included in the CMD22 command and the lower address included in the CMD18 command. The CMD23 command is used to set the data read length of the multiple read operation.

In some embodiments, if the address extension command comprises a CMD22 command and the access command comprises a CMD23 command and a CMD25 command (as shown in FIG. 3), the step of accessing the memory location of the SD card (Step 712) includes performing the multiple write operation from the memory location indicated by the combined address, which is generated according to the upper address included in the CMD22 command and the lower address included in the CMD25 command. The CMD23 command is used to set the data write length of the multiple write operation.

In some embodiments, if the address extension command comprises a CMD22 command and the access command comprises a CMD32 and a CMD38 command, the step of accessing the memory location of the SD card (Step 712) includes performing the erase operation from the memory location indicated by the combined address in response to the CMD38 command. The combined address is generated according to the upper address included in the CMD22 command and the lower address included in the CMD32 command.

In some embodiments, if the address extension command comprises a first CMD22 command and a second CMD22 command, and the access command comprises a CMD32 command, a CMD33 command and a CMD38 command (as shown in FIG. 4A), the step of accessing the memory location of the SD card (Step 712) includes performing the erase operation from the memory location indicated by a start address to another memory location indicated by an end address, wherein the start address is generated according to an upper address included in the first CMD22 command and a lower address included in the CMD32 command and the end address is generated according to an upper address included in the second CMD22 command and a lower address included in the CMD33 command. The erase operation is initiated by the CMD38 command.

In some embodiments, if the address extension command comprises a CMD22 command and the access command comprises a CMD44 command and a CMD45 command (as shown in FIG. 4B), the step of accessing the memory location of the SD card (Step 712) includes performing data transfer from the memory location indicated by the combined address, which is generated according to the upper address included in the CMD22 command and the lower address included in the CMD45 command. The CMD44 command is used to set direction of data, priority task ID and the total number of blocks to be transferred.

It is noted that the order of the steps illustrated in FIG. 7 is only exemplary and the steps can be rearranged in any other suitable order according to various applications. For example, in some other embodiments, Step 704 may precede Step 702, or, Step 710 may precede Step 708.

Figure 8:
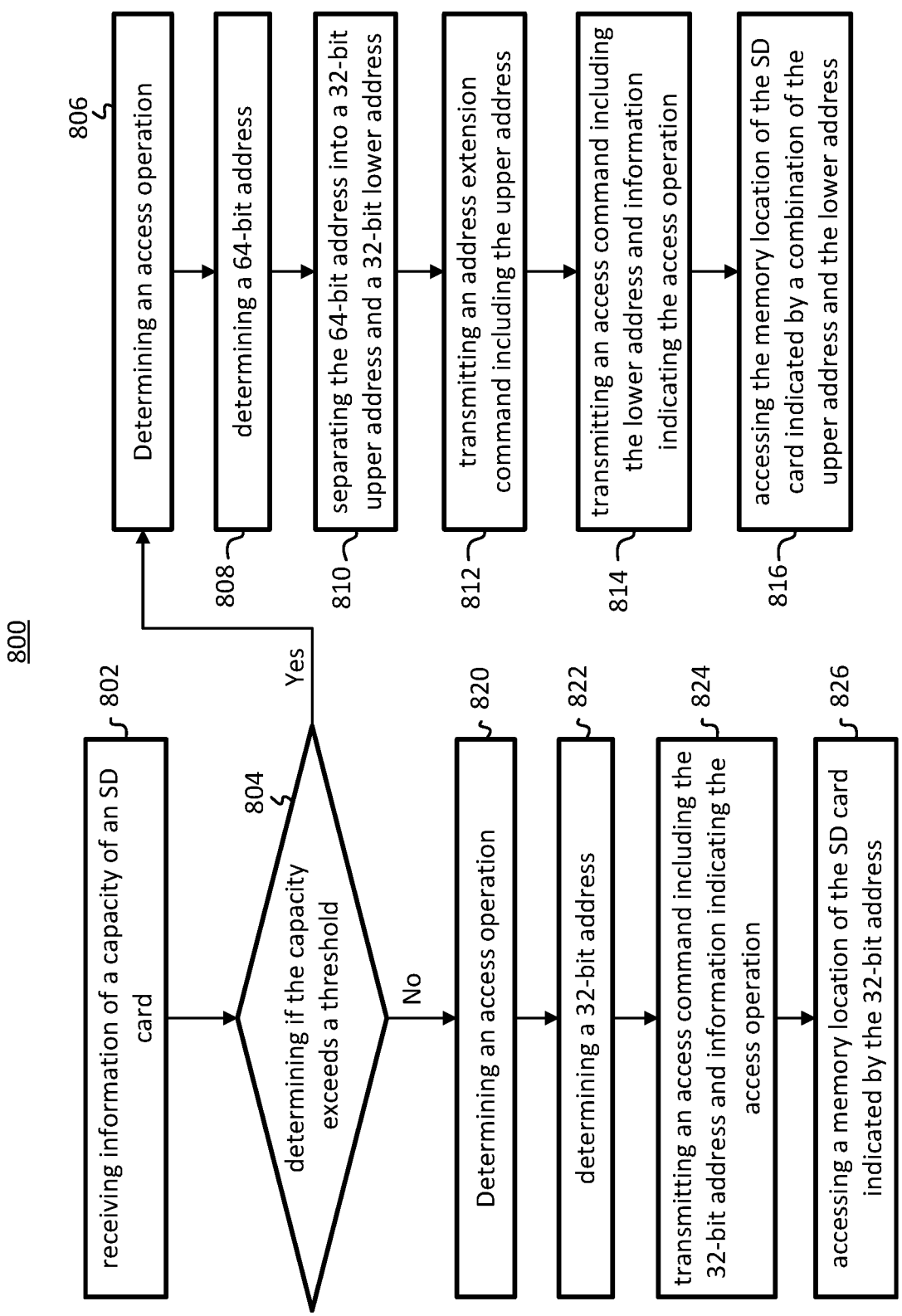
FIG. 8 is a flow chart of a method of a host for accessing an SD card in accordance with some embodiments of the present invention.

FIG. 8 is a flow chart of a method 800 performed by a host for accessing an SD card in accordance with some embodiments of the present invention. The detailed steps are as follows:

Step 802: The host receives information of a capacity of the SD card. The information may be stored in a card specific data (CSD) register in the SD card.

Step 804: The host determines if the capacity of the SD card exceeds a predetermined threshold, e.g. a capacity that can be presented by a 32-bit address. The threshold may be 2 TB or less than 2 TB. If the result is affirmative, the process goes to Step 806. If the result is negative, the process goes to Step 820.

Step 806: The host determines an access operation to be performed on the SD card. The access operation may be selected from: a single read operation, a single write operation, a multiple read operation, a multiple write operation and an erase operation.

Step 808: The host determines a memory location of the SD card subject to the access operation, wherein the memory location can be indicated by a 64-bit address.

Step 810: The host separates the 64-bit address into a 32-bit upper address and a 32-bit lower address.

Step 812: The host transmits an address extension command including the upper address (in the address argument) to the SD card via a command pin of the SD card from an I/O interface of the host.

Step 814: The host transmits an access command including the lower address (in the address argument) and information indicating the access operation (in the index) to the SD card via the command pin of the SD card.

Step 816: The host accesses the memory location of the SD card indicated by a combined address, which is a combination of the upper address and the lower address, via data pins of the SD card.

Step 820: The host determines an access operation to be performed on the SD card. The access operation may be selected from: a single read operation, a single write operation, a multiple read operation, a multiple write operation and an erase operation.

Step 822: The host determines a memory location of the SD card subject to the access operation, wherein the memory location is indicated by a 32-bit address.

Step 824: The host transmits an access command including the 32-bit address (in the address argument) and information indicating the access operation (in the index) to the SD card via the command pin of the SD card.

Step 826: The host accesses the memory location of the SD card indicated by the 32-bit address via data pins of the SD card according to the access operation in Step 824.

In the current embodiment, the host H firstly determines the capacity of the SD card. If the capacity of the SD card exceeds a threshold, such as 2 TB, the process goes to Step 806; otherwise, it goes to Step 820. The operation of Steps 806-816 are the same as those of Steps 702-712. In other words, if the host H determines that the capacity of the SD card exceeds 2 TB, the address extension command is required for accessing the SD card; otherwise, only the access command(s) is sufficient for accessing the SD card.

It is noted that the order of the steps illustrated in FIG. 8 is only exemplary and the steps can be rearranged in any other suitable order according to various applications. For example, in some other embodiments, Step 806 and Step 820 may be combined and may precede Step 802, or, Step 814 may precede Step 812.

Figure 9:
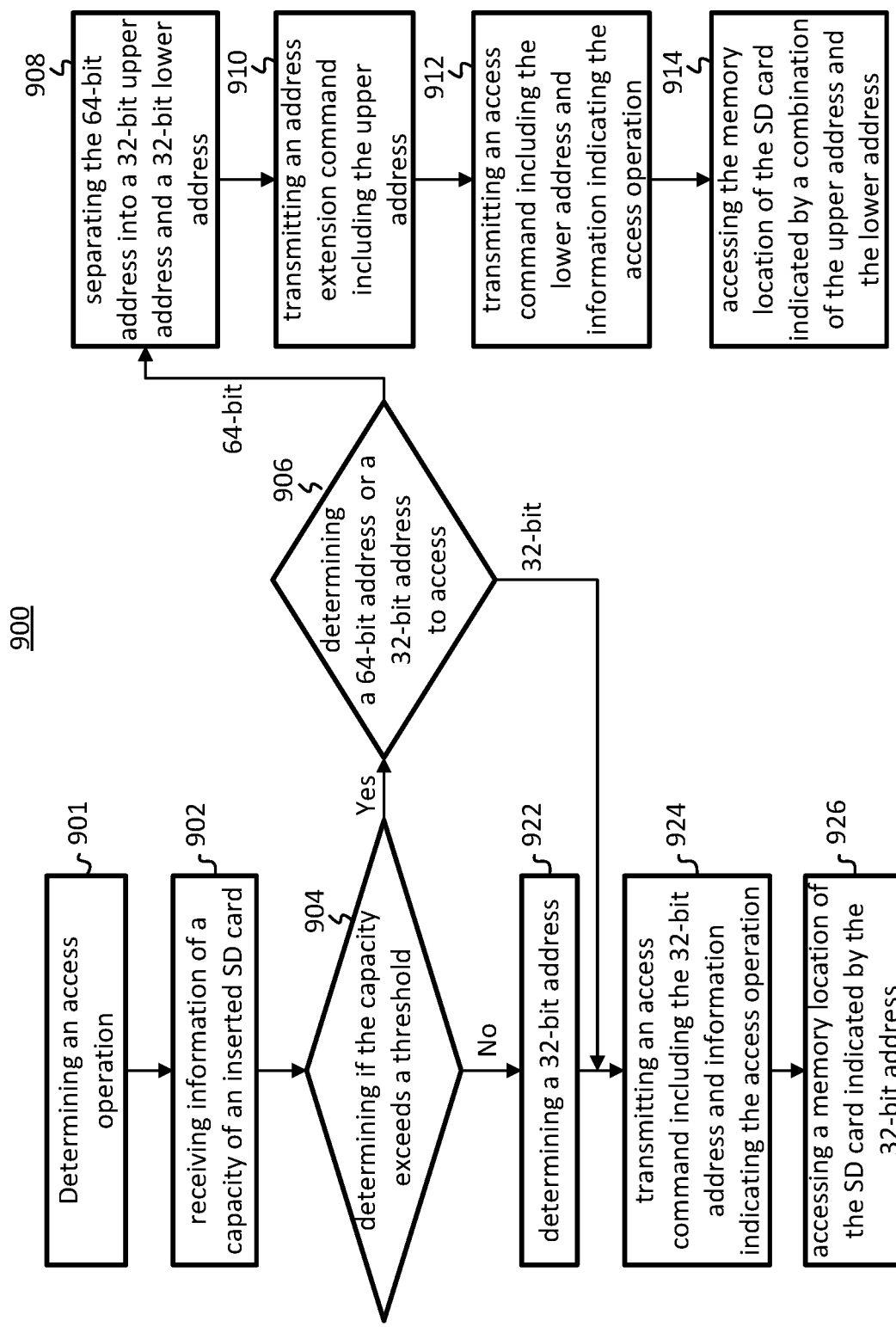
FIG. 9 is a flow chart of a method of a host for accessing an SD card in accordance with some embodiments of the present invention.

FIG. 9 is a flow chart of a method 900 performed by a host for accessing an SD card in accordance with some embodiments of the present invention. The detailed steps are as follows:

Step 901: The host determines an access operation to be performed on the SD card.

The access operation may be selected from: a single read operation, a single write operation, a multiple read operation, a multiple write operation and an erase operation.

Step 902: The host receives information of a capacity of the SD card. The information may be stored in a CSD register in the SD card.

Step 904: The host determines if the capacity of the SD card exceeds a predetermined threshold. The threshold may be 2 TB or less than 2 TB. If the result is affirmative, the process goes to Step 906. If the result is negative, the process goes to Step 922.

Step 906: The host determines a memory location of the SD card subject to the access operation determined in Step 901, wherein the memory location may be indicated by a 64-bit address or a 32-bit address. If the memory location shall be indicated by a address greater than 32-bit, the process goes to Step 908. If the memory location can be indicated by a 32-bit address, the process goes to Step 922.

Step 908: The host separates the 64-bit address into a 32-bit upper address and a 32-bit lower address.

Step 910: The host transmits an address extension command including the upper address (in the address argument) to the SD card via a command pin of the SD card from an I/O interface of the host.

Step 912: The host transmits an access command including the lower address (in the address argument) and information indicating the access operation (in the index) to the SD card via the command pin of the SD card.

Step 914: The host accesses the memory location of the SD card indicated by a combined address, which is a combination of the upper address and the lower address, via data pins of the SD card.

Step 922: The host determines a memory location of the SD card subject to the access operation, wherein the memory location is indicated by a 32-bit address.

Step 924: The host transmits an access command including the 32-bit address (in the address argument) and information indicating the access operation (in the index) to the SD card via the command pin of the SD card.

Step 926: The host accesses the memory location of the SD card indicated by the 32-bit address via data pins of the SD card according to the access operation in Step 824.

It is noted that in the method 900, even if the host recognized that the SD card supports a capacity greater than, e.g., 2 TB, the host can still choose a memory location that can be indicated by a 32-bit address to perform the access operation, wherein there is no need to transmit an address extension command.

Figure 10:
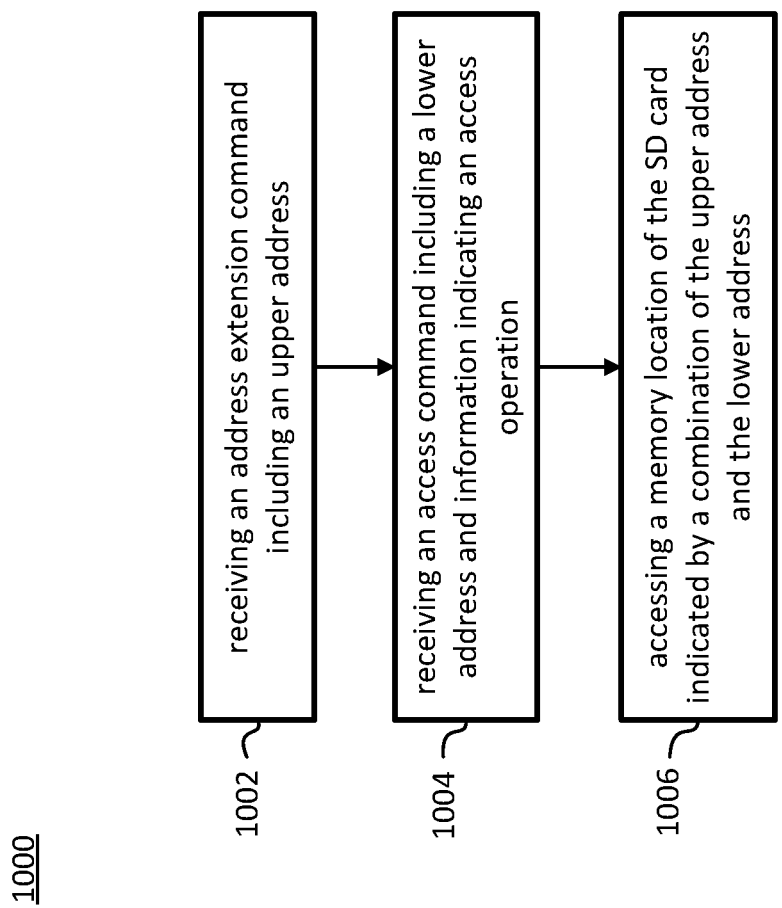
FIG. 10 is a flow chart of a method performed by an SD card or a controller of the SD card for accessing an SD card in accordance with some embodiments of the present invention.

FIG. 10 is a flow chart of a method 1000 performed by an SD card or a controller of the SD card for accessing the SD card in accordance with some embodiments of the present invention. The detailed steps are as follows:

Step 1002: The SD card (or controller of the SD card) receives an address extension command including an upper address (in the address argument) via a command pin of the SD card from an I/O interface of a host.

Step 1004: The SD card (or controller of the SD card) receives an access command including a lower address (in the address argument) and information indicating an access operation (in the index) via the command pin of the SD card. The access operation may be selected from: a single read operation, a single write operation, a multiple read operation, a multiple write operation and an erase operation.

Step 1006: The SD card (or controller of the SD card) accesses a memory location of the SD card indicated by a combined address, which is a combination of the upper address and the lower address.

The upper address and the lower address may be both 32 bits. In some other embodiments, the upper address may be 6 bits and the lower address is 32 bits. Otherwise, the upper address may be 32 bits and contain only 6 bits meaningful bits. According to the present disclosure, the number of bits (e.g. meaningful bits) of the upper address may be any number not greater than 32 and thus is not limited to the above embodiments. Furthermore, in some embodiments, the address extension command may include the lower address and the access command may include the upper address.

In some embodiments, if the address extension command comprises a CMD22 command and the access command comprises a CMD17 command, the step of accessing the memory location of the SD card (Step 1006) includes performing the single read operation on the memory location indicated by the combined address, which is generated according to the upper address included in the CMD22 command and the lower address included in the CMD17 command.

In some embodiments, if the address extension command comprises a CMD22 command and the access command comprises a CMD24 command, the step of accessing the memory location of the SD card (Step 1006) includes performing the single write operation on the memory location indicated by the combined address, which is generated according to the upper address included in the CMD22 command and the lower address included in the CMD24 command.

In some embodiments, if the address extension command comprises a CMD22 command and the access command comprises a CMD23 command and a CMD18 command (as shown in FIG. 2), the step of accessing the memory location of the SD card (Step 1006) includes performing the multiple read operation from the memory location indicated by the combined address, which is generated according to the upper address included in the CMD22 command and the lower address included in the CMD18 command. The CMD23 command is used to set the data read length of the multiple read operation.

In some embodiments, if the address extension command comprises a CMD22 command and the access command comprises a CMD23 command and a CMD25 command (as shown in FIG. 3), the step of accessing the memory location of the SD card (Step 1006) includes performing the multiple write operation from the memory location indicated by the combined address, which is generated according to the upper address included in the CMD22 command and the lower address included in the CMD25 command. The CMD23 command is used to set the data write length of the multiple write operation.

In some embodiments, if the address extension command comprises a CMD22 command and the access command comprises a CMD32 and a CMD38 command, the step of accessing the memory location of the SD card (Step 1006) includes performing the erase operation from the memory location indicated by the combined address in response to the CMD38 command. The combined address is generated according to the upper address included in the CMD22 command and the lower address included in the CMD32 command.

In some embodiments, if the address extension command comprises a first CMD22 command and a second CMD22 command, and the access command comprises a CMD32 command, a CMD33 command and a CMD38 command (as shown in FIG. 4A), the step of accessing the memory location of the SD card (Step 1006) includes performing the erase operation from the memory location indicated by a start address to another memory location indicated by an end address, wherein the start address may be generated according to an upper address included in the first CMD22 command and a lower address included in the CMD32 command and the end address may be generated according to an upper address included in the second CMD22 command and a lower address included in the CMD33 command. The erase operation is initiated by the CMD38 command.

In some embodiments, if the address extension command comprises a CMD22 command and the access command comprises a CMD44 command and a CMD45 command (as shown in FIG. 4B), the step of accessing the memory location of the SD card (Step 1006) includes performing data transfer from the memory location indicated by the combined address, which is generated according to the upper address included in the CMD22 command and the lower address included in the CMD45 command. The CMD44 command is used to set direction of data, priority task ID and the total number of blocks to be transferred.

It is noted that the order of the steps illustrated in FIG. 10 is only exemplary and the steps can be rearranged in any other suitable order according to various applications. For example, in some other embodiments, Step 1004 may precede Step 1002.

Figure 11:
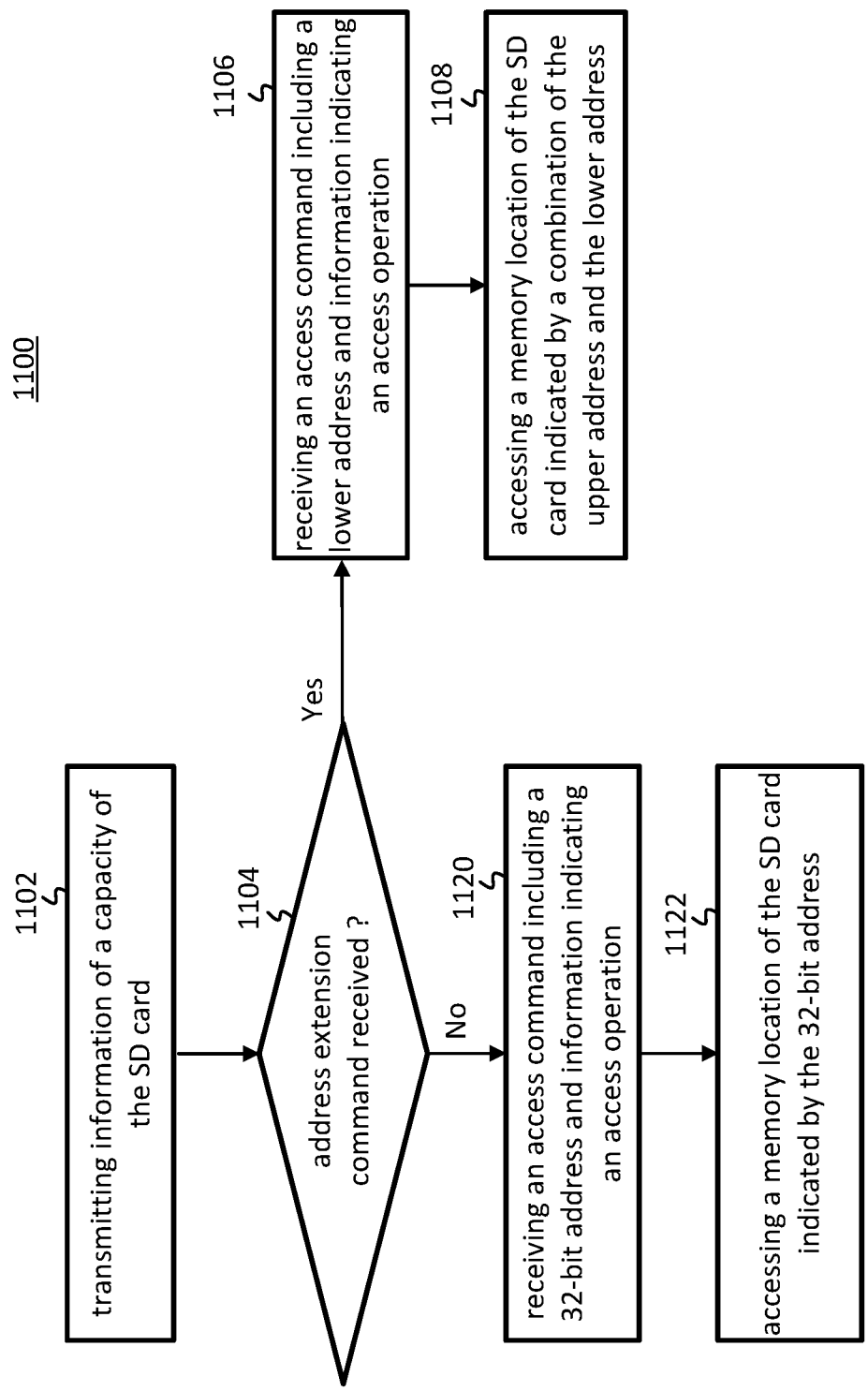
FIG. 11 is a flow chart of a method performed by an SD card or a controller of the SD card for accessing an SD card in accordance with some embodiments of the present invention.

FIG. 11 is a flow chart of a method 1100 performed by an SD card or a controller of the SD card for accessing the SD card in accordance with some embodiments of the present invention. The detailed steps are as follows:

Step 1102: The SD card (or controller of the SD card) transmits information of a capacity of the SD card to a host. The information may be stored in a CSD register in the SD card.

Step 1104: The SD card determines whether an address extension command including an upper address (in the address argument) is received. If an address extension command is received, the process goes to Step 1106; otherwise, it goes to Step 1120.

Step 1106: The SD card (or controller of the SD card) receives an access command including a lower address (in the address argument) and information indicating an access operation (in the index) via the command pin of the SD card. The access operation may be selected from: a single read operation, a single write operation, a multiple read operation, a multiple write operation and an erase operation.

Step 1108: The SD card (or controller of the SD card) accesses a memory location of the SD card indicated by a combined address, which is a combination of the upper address and the lower address. The access operation may be selected from: a single read operation, a single write operation, a multiple read operation, a multiple write operation and an erase operation.

Step 1120: The SD card (or controller of the SD card) receives an access command including a 32-bit address (in the address argument) and information indicating the access operation (in the index) via a command pin of the SD card from an I/O interface of a host.

Step 1122: The SD card (or controller of the SD card) accesses a memory location of the SD card indicated by the 32-bit address according to the access operation in Step 1120.

It is noted that the order of the steps illustrated in FIG. 11 is only exemplary and the steps can be rearranged in any other suitable order according to various applications. For example, Steps 1106 and 1120 for receiving the access command may be combined and may precede Step 1104.

Figure 12:
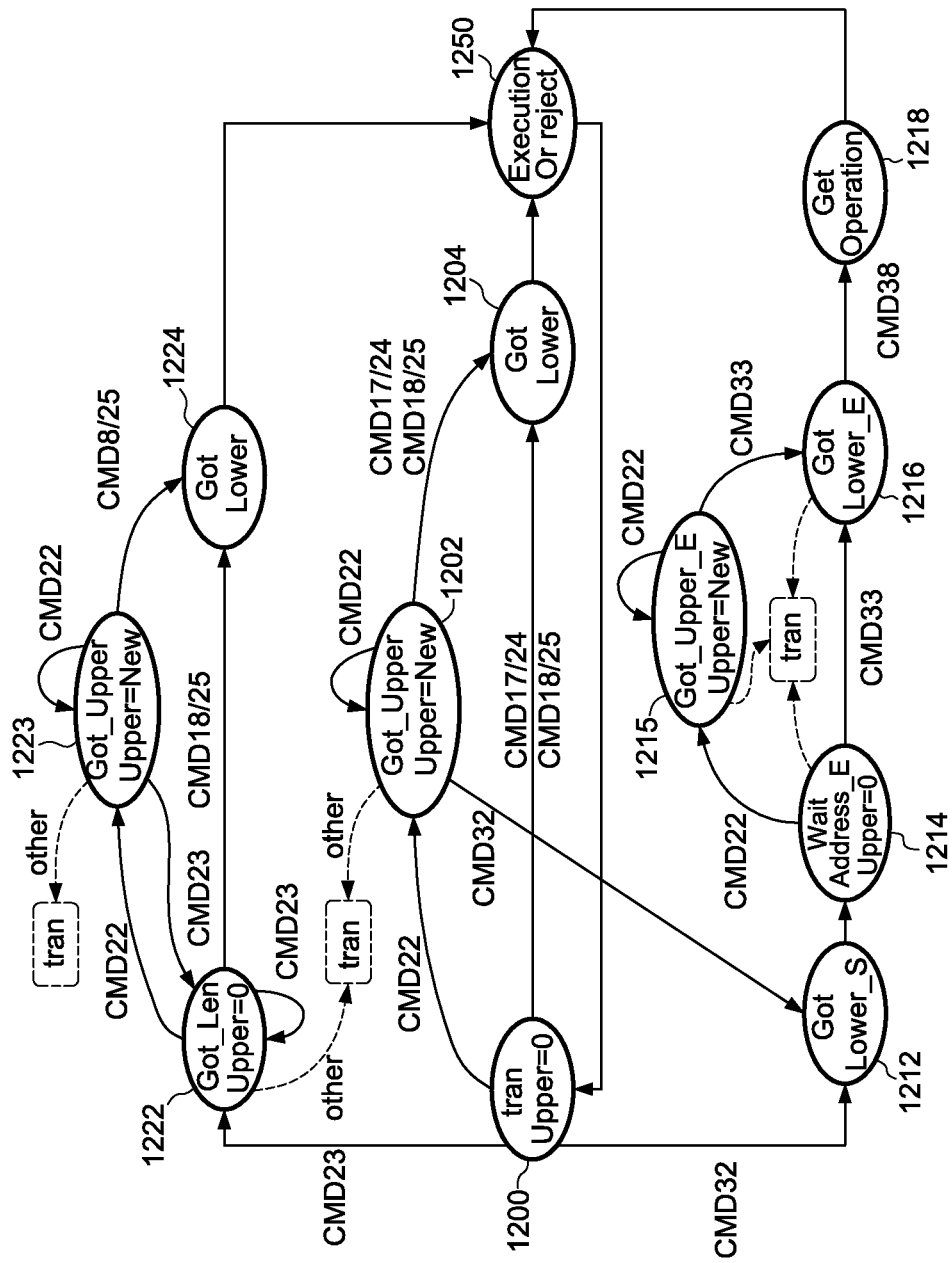
FIG. 12 is a state diagram showing the changes in the state of an SD card when the SD card is being accessed in accordance with some embodiments of the present invention.

FIG. 12 is a state diagram showing the changes in the state of an SD card when the SD card is being accessed in accordance with some embodiments of the present invention.

The state diagram starts with state 1200, a transfer state, wherein the SD card has not yet received any access command in a particular period of time. That is, the SD card has not yet received any upper address or lower address.

In state 1200, if a CMD17, CMD18, CMD24 or CMD25 command is received, a lower address carried by the CMD17, CMD18, CMD24 or CMD25 command is received by the SD card, and the SD card enters state 1204. The SD card enters state 1250 subsequently.

In state 1200, if a CMD22 command is received, an upper address carried by the CMD22 command is received by the SD card, and the SD card enters state 1202.

In state 1200, if a CMD23 command is received, a data length carried by the CMD23 command is received by the SD card, and the SD card enters state 1222, wherein the SD card has not yet received any upper address or lower address.

In state 1200, if a CMD32 command is received, a lower address carried by the CMD32 command is received by the SD card, and the SD card enters state 1212.

In state 1202, if a new CMD22 command is received, an upper address carried by the new CMD22 command replaces the upper address received when the SD card switches from state 1200 to state 1202, and the SD card stays in state 1202.

In state 1202, if a CMD17, CMD18, CMD24 or CMD25 command is received, a lower address carried by the CMD17, CMD18, CMD24 or CMD25 command is received by the SD card, and the SD card enters state 1204. The SD card enters state 1250 subsequently.

In state 1202, if a command 32 is received, a lower address carried by the CMD32 command is received by the SD card, and the SD card enters state 1212.

In state 1222, if a new CMD23 command is received, a data length carried by the new CMD23 command replaces the data length received when the SD card switches from state 1200 to state 1222, and the SD card stays in state 1222.

In state 1222, if a CMD22 command is received, an upper address carried by the CMD22 command is received by the SD card, and the SD card enters state 1223.

In state 1222, if a CMD18 or CMD25 command is received, a lower address carried by the CMD18 or CMD25 command is received by the SD card, and the SD card enters state 1224, wherein the SD card enters state 1250 subsequently.

In state 1223, if a new CMD22 command is received, an upper address carried by the new CMD22 command replaces the upper address received when the SD card switches from state 1222 to state 1223, and the SD card stays in state 1223.

In state 1223, if a new CMD23 command is received, a data length carried by the new CMD23 command replaces the current data length, and the SD card returns to state 1222.

In state 1223, if a CMD18 or CMD25 command is received, a lower address carried by the CMD18 or CMD25 command is received by the SD card, and the SD card enters state 1224, wherein the SD card enters state 1250 subsequently.

In state 1212, the SD card subsequently enters state 1214.

In state 1214, if a CMD33 command is received, a lower address carried by the CMD33 command is received by the SD card, and the SD card enters state 1216.

In state 1214, if a CMD22 command is received, an upper address carried by the CMD22 command is received by the SD card, and the SD card enters state 1215.

In state 1215, if a new CMD22 command is received, an upper address carried by the new CMD22 command replaces the upper address received when the SD card switches from state 1214 to state 1215, and the SD card stays in state 1215.

In state 1215, if a CMD33 command is received, a lower address carried by the CMD33 command is received by the SD card, and the SD card enters state 1216.

In state 1216, if a CMD38 command is received, a corresponding operation (e.g., an erase operation) is instructed to the SD card, and the SD card enters state 1218, wherein the SD card enters state 1250 subsequently.

In state 1250, the SD card is accessed according to the operation indicated by the index field of the access command (such as CMD17, CMD18, CMD24, CMD25, CMD32, and CMD33) at the location of the SD card determined by the lower address or a combination of the upper address and the lower address. If the determined location cannot be accessed (e.g., within a read-only area) or does not exist in the SD card (e.g., exceeds the capacity of the SD card), the access would be rejected and the SD card returns to state 1200.

It is noted that, in the exemplary embodiment shown in FIG. 12, in state 1202, state 1222, state 1223, state 1214, state 1215, and state 1216, if an unexpected command (i.e., a command other than the commands described in their respective descriptions above) is received, the SD card returns to the transfer state 1200 (as indicated by the dotted arrows).

In view of the above, persons with ordinary skills in the art can understand that the flow charts depicted in FIGS. 7-11 are embodiments of the subject disclosure and can derive other flow charts performed by an SD card or a host based on the state diagram of FIG. 12.

The present disclosure may further be described using the following clauses:

1. A method for accessing a secure digital (SD) card, which comprises:
a voltage supply pin for receiving voltage supply from a host;
at least one ground pin;
a clock pin for receiving a clock signal from the host;
a command pin for receiving a command from the host; and
four data pins for writing data into the SD card or reading data from the SD card,
the method comprising:
receiving, via the command pin, an address extension command including a first address from the host;
receiving, via the command pin, an access command including a second address from the host; and
accessing, via the data pins, at least a memory location of the SD card indicated by a third address, which is a combination of the first address and the second address;
wherein the access command indicates an access operation to be performed on the SD card selected from: a single read operation, a single write operation, a multiple read operation, a multiple write operation and an erase operation.

2. The method of clause 1, wherein the third address is generated by connecting the first address and the second address in serial.

3. The method of clause 1, wherein the first address and the second address are both 32 bits.

4. The method of clause 1, wherein the first address is 6 bits and the second address is 32 bits.

5. The method of clause 1, wherein if the address extension command comprises a CMD22 command and the access command comprises a CMD17 command, the step of accessing the memory location of the SD card includes performing the single read operation on the memory location indicated by the third address, and wherein the third address is generated according to the first address included in the CMD22 command and the second address included in the CMD17 command.

6. The method of clause 1, wherein if the address extension command comprises a CMD22 command and the access command comprises a CMD24 command, the step of accessing the memory location of the SD card includes performing the single write operation on the memory location indicated by the third address, and wherein the third address is generated according to the first address included in the CMD22 command and the second address included in the CMD24 command.

7. The method of clause 1, wherein if the address extension command comprises a CMD22 command and the access command comprises a CMD23 command and a CMD18 command, the step of accessing the memory location of the SD card includes performing the multiple read operation from the memory location indicated by the third address, and wherein the third address is generated according to the first address included in the CMD22 command and the second address included in the CMD18 command.

8. The method of clause 1, wherein if the address extension command comprises a CMD22 command and the access command comprises a CMD23 command and a CMD25 command, the step of accessing the memory location of the SD card includes performing the multiple write operation from the memory location indicated by the third address and wherein the third address is generated according to the first address included in the CMD22 command and the second address included in the CMD25 command.

9. The method of clause 1, wherein if the address extension command comprises a CMD22 command and the access command comprises a CMD32 and a CMD38 command, the step of accessing the memory location of the SD card includes performing the erase operation from the memory location indicated by the third address in response to the CMD38 command, and wherein the third address is generated according to the CMD22 command and the CMD32 command.

10. The method of clause 1, wherein if the address extension command comprises a first CMD22 command and a second CMD22 command, and the access command comprises a CMD32 command, a CMD33 command and a CMD38 command, the step of accessing the memory location of the SD card includes performing the erase operation from the memory location indicated by the third address to another memory location indicated by a fourth address in response to the CMD38 command, and wherein the third address is generated according to the first CMD22 command and the CMD32 command and the fourth address is generated according to the second CMD22 command and the CMD33 command.

11. The method of clause 1, wherein if the address extension command comprises a CMD22 command and the access command comprises a CMD44 command and a CMD45 command, the step of accessing the memory location of the SD card includes performing data transfer from the memory location indicated by the third address and wherein the third address is generated according to the first address included in the CMD22 command and the second address included in the CMD45 command.

12. The method of clause 1, further comprising transmitting information of a capacity of the SD card to the host.

13. A controller of an SD card, configured to perform the method of any one of clauses 1-12.

14. A method for accessing an SD card, which comprises:
a voltage supply pin for receiving voltage supply from a host;
at least one ground pin;
a clock pin for receiving a clock signal from the host;
a command pin for receiving a command from the host; and
four data pins for writing data into the SD card or reading data from the SD card,
the method comprising:
transmitting, via the command pin, an address extension command including a first address to the SD card;
transmitting, via the command pin, an access command including a second address to the SD card; and
accessing, via the data pins, at least a memory location of the SD card indicated by a third address, which is a combination of the first address and the second address;
wherein the access command indicates an access operation to be performed on the SD card selected from: a single read operation, a single write operation, a multiple read operation, a multiple write operation and an erase operation.

15. The method of clause 14, wherein the third address is generated by connecting the first address and the second address in serial.

16. The method of clause 14, further comprising receiving information of a capacity of the SD card; wherein the step of transmitting the address extension command is performed if the capacity of the SD card exceeds a predetermined threshold.

17. The method of clause 14, wherein the first address and the second address are both 32 bits.

18. The method of clause 14, wherein the first address is 6 bits and the second address is 32 bits.

19. The method of clause 14, wherein if the address extension command comprises a CMD22 command and the access command comprises a CMD17 command, the step of accessing the memory location of the SD card includes performing the single read operation on the memory location indicated by the third address, and wherein the third address is generated according to the first address included in the CMD22 command and the second address included in the CMD17 command.

20. The method of clause 14, wherein if the address extension command comprises a CMD22 command and the access command comprises a CMD24 command, the step of accessing the memory location of the SD card includes performing the single write operation on the memory location indicated by the third address, and wherein the third address is generated according to the first address included in the CMD22 command and the second address included in the CMD24 command.

21. The method of clause 14, wherein if the address extension command comprises a CMD22 command and the access command comprises a CMD23 command and a CMD18 command, the step of accessing the memory location of the SD card includes performing the multiple read operation from the memory location indicated by the third address, and wherein the third address is generated according to the first address included in the CMD22 command and the second address included in the CMD18 command.

22. The method of clause 14, wherein if the address extension command comprises a CMD22 command and the access command comprises a CMD23 command and a CMD25 command, the step of accessing the memory location of the SD card includes performing the multiple write operation from the memory location indicated by the third address and wherein the third address is generated according to the first address included in the CMD22 command and the second address included in the CMD25 command.

23. The method of clause 14, wherein if the address extension command comprises a CMD22 command and the access command comprises a CMD32 and a CMD38 command, the step of accessing the memory location of the SD card includes performing the erase operation from the memory location indicated by the third address in response to the CMD38 command, and wherein the third address is generated according to the CMD22 command and the CMD32 command.

24. The method of clause 14, wherein if the address extension command comprises a first CMD22 command and a second CMD22 command, and the access command comprises a CMD32 command, a CMD33 command and a CMD38 command, the step of accessing the memory location of the SD card includes performing the erase operation from the memory location indicated by the third address to another memory location indicated by a fourth address in response to the CMD38 command, and wherein the third address is generated according to the first CMD22 command and the CMD32 command and the fourth address is generated according to the second CMD22 command and the CMD33 command.

25. The method of clause 14, wherein if the address extension command comprises a CMD22 command and the access command comprises a CMD44 command and a CMD45 command, the step of accessing the memory location of the SD card includes performing data transfer from the memory location indicated by the third address and wherein the third address is generated according to the first address included in the CMD22 command and the second address included in the CMD45 command.

26. The method of clause 14, further comprising:
determining to access a memory location which can be indicated by a fourth address;
transmitting, via the command pin, another access command including the fourth address to the SD card; and
accessing, via the data pins, the memory location of the SD card indicated by the fourth address.

27. An SD card comprising:
a memory module including a plurality of memory locations;
an input/output (I/O) interface comprising:
a voltage supply pin for receiving voltage supply from a host;
at least one ground pin;
a clock pin for receiving a clock signal from the host;
a command pin for receiving a command from the host; and
four data pins for writing data into the SD card or reading data from the SD card; and
a controller configured to:
receive, via the command pin, an address extension command including a first address from the I/O interface;
receive, via the command pin, an access command including a second address from the I/O interface; and
access at least one of the plurality of memory locations indicated by a third address which is a combination of the first address and the second address,
wherein the access command indicates an access operation to be performed on the SD card selected from: a single read operation, a single write operation, a multiple read operation, a multiple write operation and an erase operation.

28. The SD card of clause 27, wherein the third address is generated by connecting the first address and the second address in serial.

29. The SD card of clause 27, wherein the upper address and the lower address are both 32 bits.

30. The SD card of clause 27, wherein the upper address is 6 bits and the lower address is 32 bits.

31. The SD card of clause 27, wherein if the address extension command comprises a CMD22 command and the access command comprises a CMD17 command, the controller performs a single read operation on the memory location indicated by the third address, and wherein the third address is generated according to the first address included in the CMD22 command and the second address included in the CMD17 command.

32. The SD card of clause 27, wherein if the address extension command comprises a CMD22 command and the access command comprises a CMD24 command, the controller performs a single write operation on the memory location indicated by the third address, and wherein the third address is generated according to the first address included in the CMD22 command and the second address included in the CMD24 command.

33. The SD card of clause 27, wherein if the address extension command comprises a CMD22 command and the access command comprises a CMD23 command and a CMD18 command, the controller performs a multiple read operation from the memory location indicated by the third address, and wherein the third address is generated according to the first address included in the CMD22 command and the second address included in the CMD18 command.

34. The SD card of clause 27, wherein if the address extension command comprises a CMD22 command and the access command comprises a CMD23 command and a CMD25 command, the controller performs a multiple write operation from the memory location indicated by the third address and wherein the third address is generated according to the first address included in the CMD22 command and the second address included in the CMD25 command.

35. The SD card of clause 27, wherein if the address extension command comprises a CMD22 command and the access command comprises a CMD32 and a CMD38 command, the controller performs an erase operation from the memory location indicated by the third address in response to the CMD38 command, and wherein the third address is generated according to the CMD22 command and the CMD32 command.

36. The SD card of clause 27, wherein if the address extension command comprises a first CMD22 command and a second CMD22 command, and the access command comprises a CMD32 command, a CMD33 command and a CMD38 command, the controller performs an erase operation from the memory location indicated by the third address to another memory location indicated by a fourth address in response to the CMD38 command, and wherein the third address is generated according to the first CMD22 command and the CMD32 command and the fourth address is generated according to the second CMD22 command and the CMD33 command.

37. The SD card of clause 27, wherein if the address extension command comprises a CMD22 command and the access command comprises a CMD44 command and a CMD45 command, the controller performs data transfer from the memory location indicated by the third address, and wherein the third address is generated according to the first address included in the CMD22 command and the second address included in the CMD45 command.

38. The SD card of clause 27, wherein the controller is further configured to transmit information of a capacity of the SD card to the host.

39. An electronic device capable of accessing an SD card comprising:
an I/O interface comprising:
a voltage supply contact for providing voltage supply to the SD card;
at least one ground contact;
a clock contact for providing a clock signal to the SD card;
a command contact for providing a command to the SD card; and
four data contacts for writing data into the SD card or reading data from the SD card; and
a processor configured to:
transmit, via the command contact, an address extension command including a first address to the SD card;
transmit, via the command contact, an access command including a second address to the SD card; and
access, via the data contacts, at least a memory location of the SD card indicated by a third address which is a combination of the first address and the second address;
wherein the access command indicates an access operation to be performed on the SD card selected from: a single read operation, a single write operation, a multiple read operation, a multiple write operation and an erase operation.

40. The electronic device of clause 39, wherein the third address is generated by connecting the first address and the second address in serial.

41. The electronic device of clause 39, wherein the processor is further configured to determine a capacity of the SD card based on an information received from the I/O interface; and wherein the address extension command is transmitted if the determined capacity of the SD card exceeds a predetermined threshold.

42. The electronic device of clause 39, wherein the first address and the second address are both 32 bits.

43. The electronic device of clause 39, wherein the first address is 6 bits and the second address is 32 bits.

44. The electronic device of clause 39, wherein if the address extension command comprises a CMD22 command and the access command comprises a CMD17 command, the processor performs a single read operation on the memory location indicated by the third address, and wherein the third address is generated according to the first address included in the CMD22 command and the second address included in the CMD17 command.

45. The electronic device of clause 39, wherein if the address extension command comprises a CMD22 command and the access command comprises a CMD24 command, the processor performs a single write operation on the memory location indicated by the third address, and wherein the third address is generated according to the first address included in the CMD22 command and the second address included in the CMD24 command.

46. The electronic device of clause 39, wherein if the address extension command comprises a CMD22 command and the access command comprises a CMD23 command and a CMD18 command, the processor performs a multiple read operation from the memory location indicated by the third address, and wherein the third address is generated according to the first address included in the CMD22 command and the second address included in the CMD18 command.

47. The electronic device of clause 39, wherein if the address extension command comprises a CMD22 command and the access command comprises a CMD23 command and a CMD25 command, the processor performs a multiple write operation from the memory location indicated by the third address and wherein the third address is generated according to the first address included in the CMD22 command and the second address included in the CMD25 command.

48. The electronic device of clause 39, wherein if the address extension command comprises a CMD22 command and the access command comprises a CMD32 and a CMD38 command, the processor performs an erase operation from the memory location indicated by the third address in response to the CMD38 command, and wherein the third address is generated according to the CMD22 command and the CMD32 command.

49. The electronic device of clause 39, wherein if the address extension command comprises a first CMD22 command and a second CMD22 command, and the access command comprises a CMD32 command, a CMD33 command and a CMD38 command, the processor performs an erase operation from the memory location indicated by the third address to another memory location indicated by a fourth address in response to the CMD38 command, and wherein the third address is generated according to the first CMD22 command and the CMD32 command and the fourth address is generated according to the second CMD22 command and the CMD33 command.

50. The electronic device of clause 39, wherein if the address extension command comprises a CMD22 command and the access command comprises a CMD44 command and a CMD45 command, the processor performs data transfer from the memory location indicated by the third address, and wherein the third address is generated according to the first address included in the CMD22 command and the second address included in the CMD45 command.

51. The electronic device of clause 39, wherein if the electronic device determines to access a memory location which can be indicated by a fourth address, the processor is further configured to:
transmitting, via the command pin, another access command including the fourth address to the SD card; and
accessing, via the data pins, the memory location of the SD card indicated by the fourth address.

It should be noted that the above disclosure is for illustrative purposes and should not be deemed as limiting the present disclosure. Those skilled in the art will readily observe that numerous modifications and alterations of the device and method may be made while retaining the teachings of the present disclosure. Accordingly, the above disclosure should be construed as limited only by the metes and bounds of the appended claims.

What is claimed is:

1. A method for accessing a secure digital (SD) card, which comprises:
a voltage supply pin for receiving voltage supply from a host;
at least one ground pin;
a clock pin for receiving a clock signal from the host;
a command pin for receiving a command from the host; and
four data pins for writing data into the SD card or reading data from the SD card, the method comprising:
receiving, via the command pin, an address extension command including a first address from the host;
receiving, via the command pin, an access command including a second address from the host; and
accessing at least a memory location of the SD card indicated by a third address, which is a combination of the first address and the second address;
wherein the access command indicates an access operation to be performed on the SD card selected from: a single read operation, a single write operation, a multiple read operation, a multiple write operation and an erase operation;
wherein if the address extension command comprises a CMD22 command and the access command comprises a CMD23 command and a CMD18 command, the step of accessing the memory location of the SD card includes performing the multiple read operation from the memory location indicated by the third address, and wherein the third address is generated according to the first address included in the CMD22 command and the second address included in the CMD18 command.

2. The method of claim 1, wherein the third address is generated by connecting the first address and the second address in serial.

3. The method of claim 1, wherein the first address and the second address are both 32 bits.

4. The method of claim 1, wherein the first address is 6 bits and the second address is 32 bits.

5. The method of claim 1, wherein if the address extension command comprises a CMD22 command and the access command comprises a CMD17 command, the step of accessing the memory location of the SD card includes performing the single read operation on the memory location indicated by the third address, and wherein the third address is generated according to the first address included in the CMD22 command and the second address included in the CMD17 command.

6. The method of claim 1, wherein if the address extension command comprises a CMD22 command and the access command comprises a CMD24 command, the step of accessing the memory location of the SD card includes performing the single write operation on the memory location indicated by the third address, and wherein the third address is generated according to the first address included in the CMD22 command and the second address included in the CMD24 command.

7. The method of claim 1, wherein if the address extension command comprises a CMD22 command and the access command comprises a CMD23 command and a CMD25 command, the step of accessing the memory location of the SD card includes performing the multiple write operation from the memory location indicated by the third address and wherein the third address is generated according to the first address included in the CMD22 command and the second address included in the CMD25 command.

8. The method of claim 1, wherein if the address extension command comprises a CMD22 command and the access command comprises a CMD32 and a CMD38 command, the step of accessing the memory location of the SD card includes performing the erase operation from the memory location indicated by the third address in response to the CMD38 command, and wherein the third address is generated according to the CMD22 command and the CMD32 command.

9. The method of claim 1, wherein if the address extension command comprises a first CMD22 command and a second CMD22 command, and the access command comprises a CMD32 command, a CMD33 command and a CMD38 command, the step of accessing the memory location of the SD card includes performing the erase operation from the memory location indicated by the third address to another memory location indicated by a fourth address in response to the CMD38 command, and wherein the third address is generated according to the first CMD22 command and the CMD32 command and the fourth address is generated according to the second CMD22 command and the CMD33 command.

10. The method of claim 1, wherein if the address extension command comprises a CMD22 command and the access command comprises a CMD44 command and a CMD45 command, the step of accessing the memory location of the SD card includes performing data transfer from the memory location indicated by the third address and wherein the third address is generated according to the first address included in the CMD22 command and the second address included in the CMD45 command.

11. A controller of an SD card, configured to perform the method of any one of claims 1-6 and 7-10.

12. A method for accessing a secure digital (SD) card, which comprises:
a voltage supply pin for receiving voltage supply from a host;
at least one ground pin;
a clock pin for receiving a clock signal from the host;
a command pin for receiving a command from the host; and
four data pins for writing data into the SD card or reading data from the SD card, the method comprising:
receiving, via the command pin, an address extension command including a first address from the host;
receiving, via the command pin, an access command including a second address from the host; and
accessing at least a memory location of the SD card indicated by a third address, which is a combination of the first address and the second address;
wherein the access command indicates an access operation to be performed on the SD card selected from: a single read operation, a single write operation, a multiple read operation, a multiple write operation and an erase operation;

wherein if the address extension command comprises a first CMD22 command and a second CMD22 command, and the access command comprises a CMD32 command, a CMD33 command and a CMD38 command, the step of accessing the memory location of the SD card includes performing the erase operation from the memory location indicated by the third address to another memory location indicated by a fourth address in response to the CMD38 command, and wherein the third address is generated according to the first CMD22 command and the CMD32 command and the fourth address is generated according to the second CMD22 command and the CMD33 command.

13. The method of claim 12, wherein if the address extension command comprises a CMD22 command and the access command comprises a CMD44 command and a CMD45 command, the step of accessing the memory location of the SD card includes performing data transfer from the memory location indicated by the third address and wherein the third address is generated according to the first address included in the CMD22 command and the second address included in the CMD45 command.

14. The method of claim 12, further comprising transmitting information of a capacity of the SD card to the host.

15. An SD card, comprising:
- a voltage supply pin for receiving voltage supply from a host;
- at least one ground pin;
- a clock pin for receiving a clock signal from the host;
- a command pin for receiving a command from the host;
- four data pins for writing data into the SD card or reading data from the SD card; and
- a controller configured to perform the method of any one of claims 1-6, 7-10, 12-13 and 14.

* * * * *